(12) United States Patent
Kim et al.

(10) Patent No.: US 11,585,934 B2
(45) Date of Patent: Feb. 21, 2023

(54) CART ROBOT HAVING AUTO-FOLLOW FUNCTION

(71) Applicant: LG ELECTRONICS INC., Seoul (KR)

(72) Inventors: Anna Kim, Seoul (KR); Sunryang Kim, Seoul (KR); Joohan Kim, Seoul (KR); Jaecheon Sa, Seoul (KR); Kangsoo Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 379 days.

(21) Appl. No.: 16/862,216

(22) Filed: Apr. 29, 2020

(65) Prior Publication Data
US 2020/0346352 A1 Nov. 5, 2020

(30) Foreign Application Priority Data

Apr. 30, 2019 (WO) ................ PCT/KR2019/005214
Oct. 18, 2019 (KR) ........................ 10-2019-0130057

(51) Int. Cl.
*G01S 17/89* (2020.01)
*B62B 5/00* (2006.01)

(52) U.S. Cl.
CPC ............ *G01S 17/89* (2013.01); *B62B 5/0069* (2013.01)

(58) Field of Classification Search
CPC ..... G01S 17/89; G01S 17/931; B62B 5/0069; B62B 5/0076; B62B 5/0006; B62B 5/004; B62B 5/0043; B62B 5/0053; B62B 5/0073; B62B 5/06; G05B 2219/40411; B25J 5/007; B25J 9/1669; B25J 11/008; G05D 1/0011; G05D 1/0214
See application file for complete search history.

(56) References Cited

U.S. PATENT DOCUMENTS

| | | | |
|---|---|---|---|
| 8,327,963 B1 * | 12/2012 | Faulkingham | B62B 3/04 180/9.1 |
| 9,643,638 B1 * | 5/2017 | Wittliff, III | G05D 1/0016 |
| 10,239,544 B1 * | 3/2019 | DeMartine | B61B 13/00 |
| 10,310,506 B1 * | 6/2019 | Qi | A45C 15/00 |
| 10,493,624 B1 * | 12/2019 | Nabat | B25J 13/085 |
| 11,020,858 B2 * | 6/2021 | Amacker | B25J 11/008 |

(Continued)

FOREIGN PATENT DOCUMENTS

| | | | | |
|---|---|---|---|---|
| CN | 108357525 A | * | 8/2018 | ............ B62B 3/001 |
| FR | 2980436 A1 | * | 3/2013 | ............ A63B 55/61 |

(Continued)

*Primary Examiner* — James A Shriver, II
*Assistant Examiner* — Ian Bryce Shelton
(74) *Attorney, Agent, or Firm* — Birch, Stewart, Kolasch & Birch, LLP

(57) ABSTRACT

A cart robot performing an auto-follow function of following a user, the cart robot, including a storage space storing goods; a main body coupled to a lower portion of the storage space and supporting the storage space; a handle assembly connected to a rear side of the main body; a wheel assembly rotatably coupled to a lower portion of the main body and moving the main body in a direction of force applied to the handle assembly; and a plurality of sensor assemblies provided at front side of the main body for sensing an obstacle in a forward direction and sensing and tracking a location of a transmission module.

16 Claims, 10 Drawing Sheets

(56) References Cited

U.S. PATENT DOCUMENTS

| | | | |
|---|---|---|---|
| 11,086,328 B2* | 8/2021 | Keivan | G05D 1/0214 |
| 2002/0156556 A1* | 10/2002 | Ruffner | A01D 42/00 |
| | | | 318/587 |
| 2007/0100498 A1* | 5/2007 | Matsumoto | G05D 1/024 |
| | | | 701/23 |
| 2009/0228166 A1* | 9/2009 | Durkos | G05D 1/0246 |
| | | | 701/26 |
| 2011/0010024 A1* | 1/2011 | Salisbury | G06F 3/014 |
| | | | 701/2 |
| 2015/0032252 A1* | 1/2015 | Galluzzo | B60P 1/5423 |
| | | | 700/218 |
| 2015/0066275 A1* | 3/2015 | Masaki | B62B 5/0073 |
| | | | 180/19.1 |
| 2015/0144411 A1* | 5/2015 | Washington | B62B 9/005 |
| | | | 180/167 |
| 2015/0202770 A1* | 7/2015 | Patron | G06Q 30/0265 |
| | | | 901/50 |
| 2015/0205298 A1* | 7/2015 | Stoschek | B60Q 5/005 |
| | | | 901/1 |
| 2016/0378117 A1* | 12/2016 | Szatmary | G01S 17/89 |
| | | | 382/153 |
| 2017/0108860 A1* | 4/2017 | Doane | G05D 1/0255 |
| 2017/0123428 A1* | 5/2017 | Levinson | G05D 1/0257 |
| 2018/0057034 A1* | 3/2018 | Deshpande | B62B 5/002 |
| 2018/0072212 A1* | 3/2018 | Alfaro | B60P 1/48 |
| 2018/0118245 A1* | 5/2018 | Chung | B62B 5/0043 |
| 2018/0132966 A1* | 5/2018 | Désaulniers | A61B 90/50 |
| 2018/0143639 A1* | 5/2018 | Singhal | G06Q 30/0269 |
| 2018/0162433 A1* | 6/2018 | Jones | B62B 5/0036 |
| 2018/0208398 A1* | 7/2018 | Haveman | G05D 1/0297 |
| 2018/0210448 A1* | 7/2018 | Lee | G05D 1/0274 |
| 2018/0229748 A1* | 8/2018 | Nakamura | B62B 5/004 |
| 2018/0244294 A1* | 8/2018 | Ochiai | B62B 5/004 |
| 2018/0275663 A1* | 9/2018 | Sonoura | G05D 1/0088 |
| 2018/0335786 A1* | 11/2018 | Ding | G06V 40/10 |
| 2018/0364711 A1* | 12/2018 | Goldfain | G05D 1/0011 |
| 2019/0106167 A1* | 4/2019 | Niezgoda | B60K 7/0007 |
| 2019/0291760 A1* | 9/2019 | Nakaura | B62B 5/0006 |
| 2019/0329809 A1* | 10/2019 | Mackay | B60K 17/043 |
| 2019/0344699 A1* | 11/2019 | Radetzki | B62D 33/046 |
| 2020/0012287 A1* | 1/2020 | Lee | G01S 17/931 |
| 2020/0073402 A1* | 3/2020 | Brucker | G05D 1/0278 |
| 2020/0100846 A1* | 4/2020 | Huang | G05B 19/18 |
| 2020/0142412 A1* | 5/2020 | Kajiyama | G05D 1/0255 |
| 2020/0159238 A1* | 5/2020 | Jacobsen | G01S 17/931 |
| 2020/0242544 A1* | 7/2020 | Galluzzo | G05D 1/0088 |
| 2020/0270055 A1* | 8/2020 | Schuster | B62B 5/0033 |
| 2020/0293049 A1* | 9/2020 | De Castro | G01C 21/206 |
| 2020/0307667 A1* | 10/2020 | Tang | G05D 1/0238 |
| 2020/0333789 A1* | 10/2020 | Suzuki | G05D 1/0297 |
| 2020/0375093 A1* | 12/2020 | Matus | B60W 30/04 |
| 2021/0016816 A1* | 1/2021 | Schillinger | B62B 5/0033 |
| 2021/0056788 A1* | 2/2021 | Chen | A45C 13/18 |
| 2021/0339787 A1* | 11/2021 | Andersson | B62B 5/0404 |
| 2022/0017010 A1* | 1/2022 | Taniguchi | G07C 9/00896 |

FOREIGN PATENT DOCUMENTS

| | | | | |
|---|---|---|---|---|
| JP | 2006322838 A | * | 11/2006 | |
| JP | 2019067215 A | | 4/2019 | |
| KR | 10-2009-0030158 A | | 3/2009 | |
| KR | 10-2011-0041228 A | | 4/2011 | |
| KR | 20110119438 A | * | 11/2011 | |
| KR | 20130045291 A | * | 5/2013 | |
| KR | 10-2018-0067467 A | | 6/2018 | |
| KR | 20180067467 A | * | 6/2018 | |
| KR | 10-1961797 B1 | | 3/2019 | |
| WO | WO-2012166170 A1 | * | 12/2012 | G05D 1/0061 |
| WO | WO-2017042959 A1 | * | 3/2017 | B62B 5/0073 |
| WO | WO-2018101962 A1 | * | 6/2018 | |
| WO | WO-2018213931 A1 | * | 11/2018 | B25J 5/007 |
| WO | WO-2019027161 A1 | * | 2/2019 | B62B 5/0076 |
| WO | WO-2019068405 A1 | * | 4/2019 | B62B 3/001 |

\* cited by examiner

180 : 181~186

160 : 162,164
150 : 152,154,156

CART ROBOT HAVING AUTO-FOLLOW FUNCTION

CROSS-REFERENCE TO RELATED APPLICATION

This application claims the priority benefit of International Application No. PCT/KR2019/005214 filed on Apr. 30, 2019, and Korean Patent Application No. 10-2019-0130057 filed in the Republic of Korea on Oct. 18, 2019, the disclosures of which are hereby incorporated by reference in their entireties.

BACKGROUND

1. Field

The present disclosure relates to a cart robot that is equipped with optimized parts and components and that performs an auto-follow function of following a user.

2. Background

In spaces, such as a large-scale mart, a department store, and airport and the like, various types of carts are used in order for users to carry heavy objects and heavy luggage.

A cart, which is used in spaces, such as a shopping mall, including a large-scale mart or a department store, has a structure in which a plurality of wheels are installed at a lower portion of a basket storing goods and in which a user moves the cart by pushing or pulling a handle. Thanks to the cart, users themselves do not need to carry a large amount of goods and heavy goods. Accordingly, the cart is a necessary tool for improving user convenience.

Conventionally, users themselves handle and move carts (e.g., the carts are manually operated). However, there are times when the users distract attention from the carts browsing goods in the above-described spaces. In this case, the carts move away from the users (or the users move away from the carts). Therefore, users can find handling the carts cumbersome.

Accordingly, there is a growing need for a method for enabling a user to readily handle a cart and to easily control movements of the cart while the user feels free to move without the need to handle the cart (such as by pushing or pulling) as well as easing inconvenience of the user. That is, there is a need for a cart to automatically follow a user.

Robots that can provide various services for people's daily lives have been developed in recent years. The robots are used in people's daily lives and can provide specific services (e.g., shopping, transportation, serving, communication, cleaning and the like) in response to a user's instruction.

Among the robots used in daily lives, a robot functioning as a cart of the related art performs only the function of ascending and descending a basket and a plate on which the basket is put. Accordingly, the robot as a cart can perform only limited functions.

SUMMARY

The present disclosure is directed to providing a cart robot that may perform an auto-follow function, such that the cart robot moves to follow a user by sensing a location and a moving path of the user (e.g., a user-following function).

Additionally, the present disclosure is directed to providing a cart robot that is equipped with various optimized sensors for implementing the user-following function to follow the user.

Further, the present disclosure is directed to providing a cart robot that may perform an auto-follow function, such that the cart robot is used as a shopping cart and as a cart for distributing items (e.g., moving objects), such as storage cases, luggage, grocery items, and the like, including placing the items within a basket of the cart.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

A cart robot according to the present disclosure includes: a storage space storing goods; a main body coupled to a lower portion of the storage space and supporting the storage space; a handle assembly installed in a rearward direction of the main body; a wheel assembly rotatably coupled to a lower portion of the main body and moving the main body in a direction of force applied to the handle assembly; and a plurality of sensor modules (e.g., assemblies, units) installed at one side of the main body, sensing an obstacle (e.g., object) in a forward direction (e.g., in front of) of the main body and sensing and tracking a location of a transmission module, where the plurality of sensor modules are disposed not to interfere with each other. The plurality of sensor modules include a plurality of first sensor modules (e.g., assemblies, units) installed at one side of the main body and sensing an obstacle in a forward direction of the cart; a second sensor module installed at one side in the main body and sensing an object different from an object sensed by the first sensor module; and a third sensor module installed at one side in the main body and sensing and tracking a location of a transmission module.

The main body further includes a main housing that has an opened upper side and forms an accommodation space, and an upper frame that is coupled to the opened upper side of the main housing and covers the accommodation space, and in a state in which the main housing and the upper frame are coupled, a slit spaced at a predetermined distance is formed between the main housing and the upper frame at the front of the main body.

The first sensor module includes a plurality of TOF (Time of Flight) sensors that are installed in at least part of the main housing in forward and lateral directions of the main housing, and a sensor PCB that controls the TOF sensors.

The second sensor module includes a light ranging and detecting (LiDAR) sensor that is spaced apart from the first sensor module, and a sensor PCB that controls the LiDAR sensor, and the second sensor module is installed at a height different from a height of the first sensor module.

The third sensor module includes a camera that is spaced apart from the first sensor module and the second sensor module; and a UWB (ultra-wideband) sensor that is provided with a UWB positioning sensor spaced apart from the camera and including a UWB antenna, a UWB PCB controlling the UWB positioning sensor, and a UWB main PCB communicating with the transmission module.

The TOF sensors of the first sensor module, the LiDAR sensor of the second sensor module, and the UWB antenna of the UWB positioning sensor and the camera of the third sensor module, all face a forward direction or side directions of the cart.

The main body further includes a bumper, that may be made of an elastic material, that is coupled along at least part of the main housing in the forward direction and the lateral direction of the main housing, and that protrudes further forwards than the UWB antenna of the UWB positioning sensor.

The handle assembly includes a handlebar that receives a force applied by a user; a pair of handle cover frames coupled to both ends of the handlebar and that support the handlebar; and a force sensing module (e.g., assembly, unit) that is provided with a pair of load cells installed respectively at both sides of a lower portion of the handlebar and sensing a size and a direction of force applied to the handlebar, a pair of connection frames connecting the load cells with the handlebar, and a support frame disposed between the handle cover frames and coupled to the load cells, where one end of the load cell, coupled to the support frame, is a fixed end, and the other end of the load cell, coupled to the connection frame, is a free end.

The UWB main PCB is installed at one side of the handle assembly while being spaced apart from the force sensing module.

The UWB main PCB is spaced apart from the storage space at an interval greater than a predetermined minimum interval.

A cart robot according to the present disclosure includes: a storage space storing goods; a main body coupled to a lower portion of the storage space and supporting the storage space; a handle assembly installed in a reward direction of the main body; a wheel assembly rotatably coupled to a lower portion of the main body and moving the main body in a direction of force applied to the handle assembly; and a plurality of sensor modules respectively installed at a plurality of positions on the main body, where the plurality of sensor modules are disposed not to interfere with each other.

The plurality of sensor modules include a plurality of first sensor modules installed at one side of the main body and sensing an obstacle in a forward direction of cart; and a third sensor module installed at one side in the main body and sensing tracking a location of a transmission module.

The main body further includes a main housing that has an opened upper side and that forms an accommodation space, and an upper frame that is coupled to the opened upper side of the main housing and that covers the accommodation space, and in a state in which the main housing and the upper frame are coupled, a slit spaced at a predetermined distance is formed between the main housing and the upper frame at the front of the main body.

The first sensor module includes a plurality of TOF (Time of Flight) sensors that are installed in at least part of the main housing in forward and lateral directions of the main housing, and a sensor PCB that controls the TOF sensors.

The third sensor module include a camera that is spaced apart from the first sensor module; and a UWB sensor that is provided with a UWB positioning sensor spaced apart from the camera and including a UWB antenna, a UWB PCB controlling the UWB positioning sensor, and a UWB main PCB communicating with the transmission module.

The UWB antenna of the UWB positioning sensor, the camera, and the TOF sensor are consecutively disposed in the first sensor module and the third sensor module from the forward direction of the main body toward the rearward direction of the main body.

The main body further includes a bumper that is made of an elastic material, that is coupled along at least part of the main housing in the forward direction and the lateral direction of the main housing, and that protrudes further forwards then the UWB antenna of the UWB positioning sensor.

The handle assembly includes a handlebar that receives force applied by a user; a pair of handle cover frames that are coupled to both ends of the handlebar and that support the handlebar; and a force sensing module that is provided with a pair of load cells installed respectively at both sides of a lower portion of the handlebar for sensing a magnitude and a direction of force applied to the handlebar, a pair of connection frames connecting the load cells with the handlebar, and a support frame disposed between the handle cover frames and coupled to the load cells, where one end of the load cell, coupled to the support frame, is a fixed end, and the other end of the load cell, coupled to the connection frame, is a free end.

The UWB main PCB is installed at one side of the handle assembly while being spaced apart from the force sensing module.

The UWB main PCB is spaced apart from the storage space by a predetermined minimum interval (e.g., a predetermined minimum distance).

In the cart robot, sensors providing an auto-follow function and a power-assist function are disposed not to interfere with each other and the sensors are disposed to perform their optimal functions, thereby enhancing accuracy of sensing and controlling of each sensor.

Detailed effects of the present disclosure are described together with the above-described effects in the detailed description of the disclosure.

BRIEF DESCRIPTION OF THE DRAWINGS

Embodiments are described in detail with reference to the following drawings, wherein.

DETAILED DESCRIPTION

Figure 1:
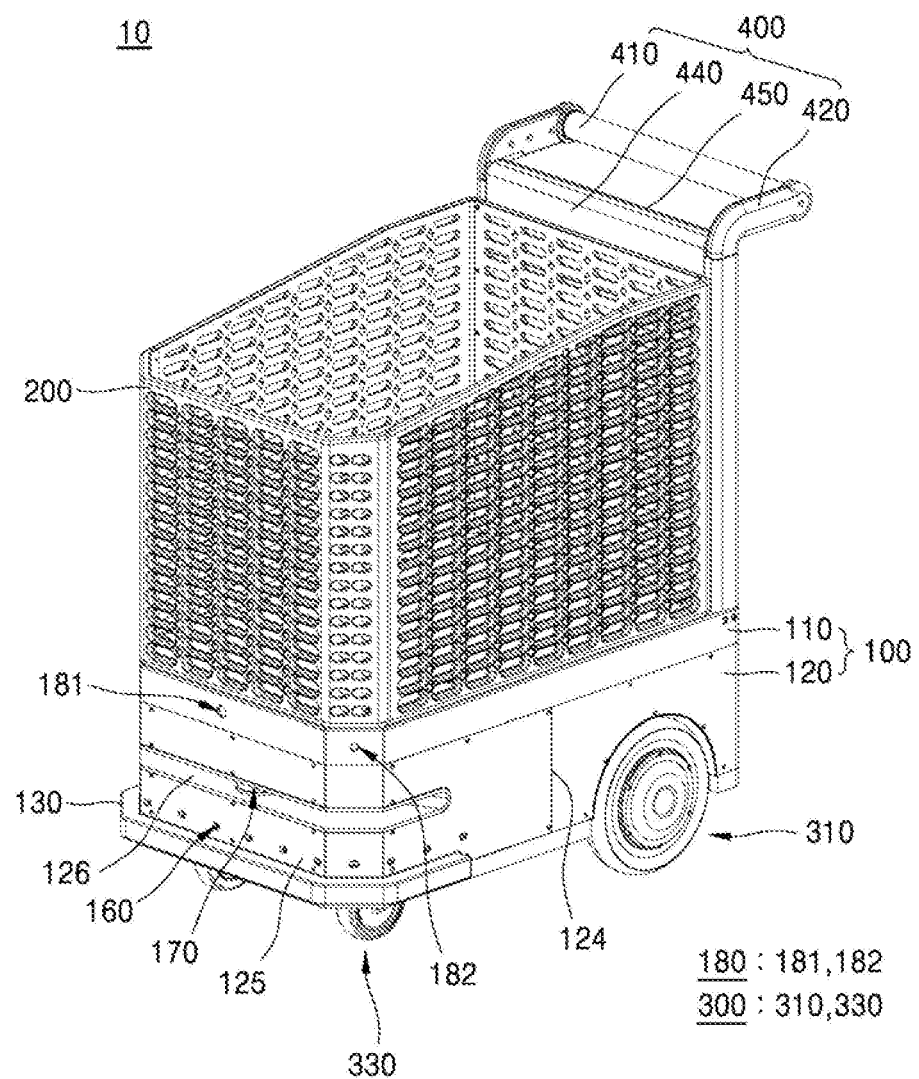
FIG. 1 is a perspective view illustrating an exemplary cart robot.

The above-described objectives, features and advantages are specifically described with reference to the attached drawings hereunder such that one having ordinary skill in the art to which the present disclosure pertains may easily implement the technical spirit of the disclosure. In describing the disclosure, detailed description of known technologies in relation to the disclosure is omitted if it is deemed to make the gist of the present disclosure unnecessarily vague. Below, preferred embodiments of the present disclosure are specifically described with reference to the attached drawings. Throughout the drawings, identical reference numerals denote identical or similar components.

When any component is described as being "at an upper portion" (or "a lower portion") of a component, or "on" (or "under") a component, any component may be placed on an upper surface (a lower surface) of the component, and an additional component may be interposed between the component and any component placed on (or under) the component.

When a component is described as being "connected," "coupled" or "connected" to another component, the component may be directly connected or able to be connected to another component; however, it is also to be understood that an additional component may be "interposed" between the two components, or the two components may be "connected," "coupled" or "connected" through an additional component.

The terms "A or B", "at least one of A or/and B", or "one or more of A or/and B" as used herein include all possible combinations of items enumerated with them. For example, "A or B", "at least one of A and B", or "at least one of A or B" means (1) including at least one A, (2) including at least one B, or (3) including both at least one A and at least one B.

Below, a "cart robot" denotes an apparatus for physical distribution (e.g., moving objects) that may be manually moved under the control of a user or that may be moved using supplied (e.g., supplied from the cart itself) electrical power. The cart robot may perform a function of storing goods or may not perform the function of storing goods. The cart robot may be used in all places, such as shopping malls including a large-scale mart, a department store, and a small-and-medium-scale store, leisure spaces including a golf course, an airport or a harbor and the like which are visited by any number of people, including a large number of people.

The cart robot in the present disclosure may be used as various types of moving robots including a shopping cart, a cart for moving objects and the like requiring an auto-follow function.

Figure 2:
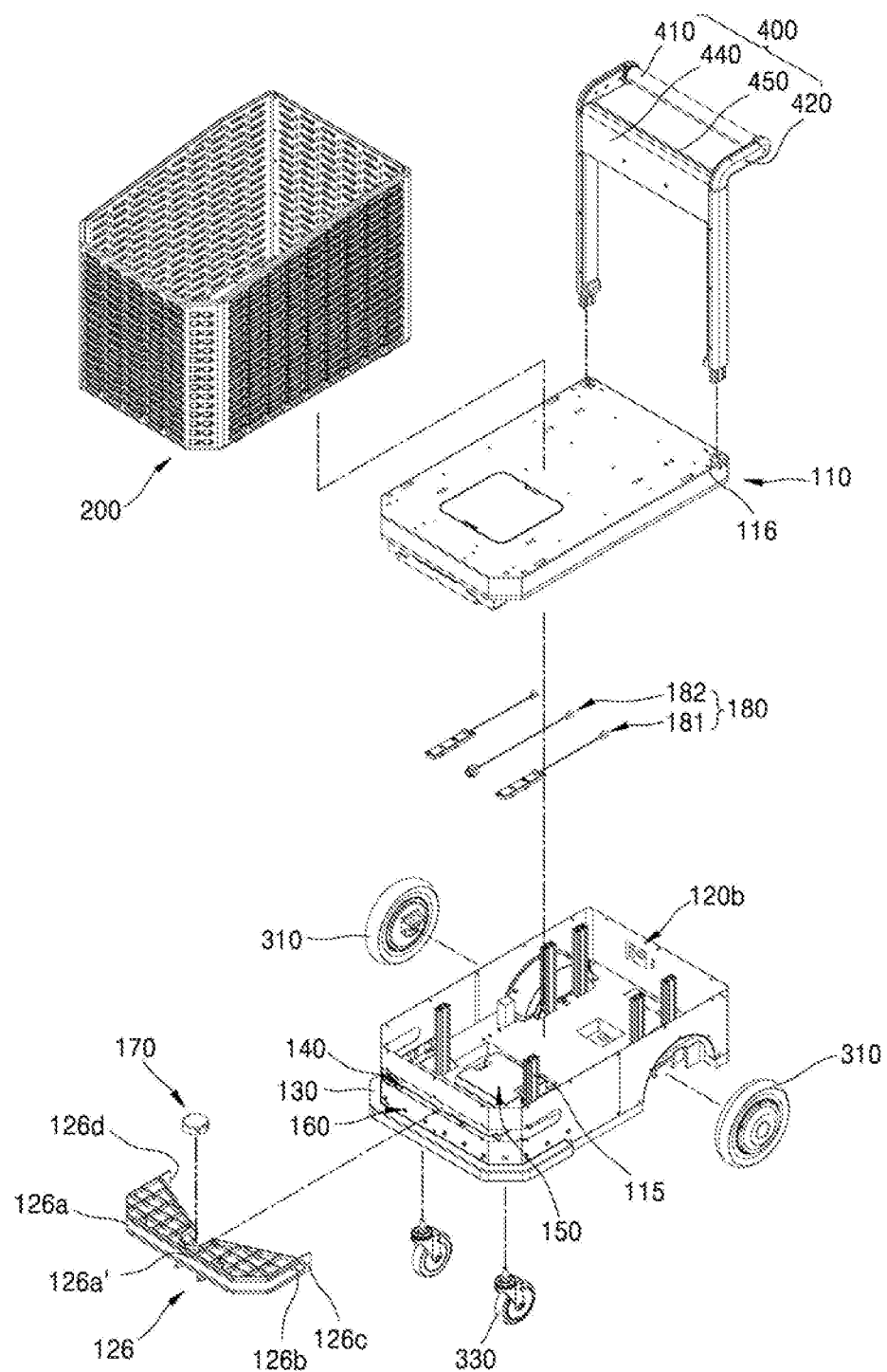
FIG. 2 is an exploded perspective view illustrating the cart robot in FIG. 1.
Figure 3:
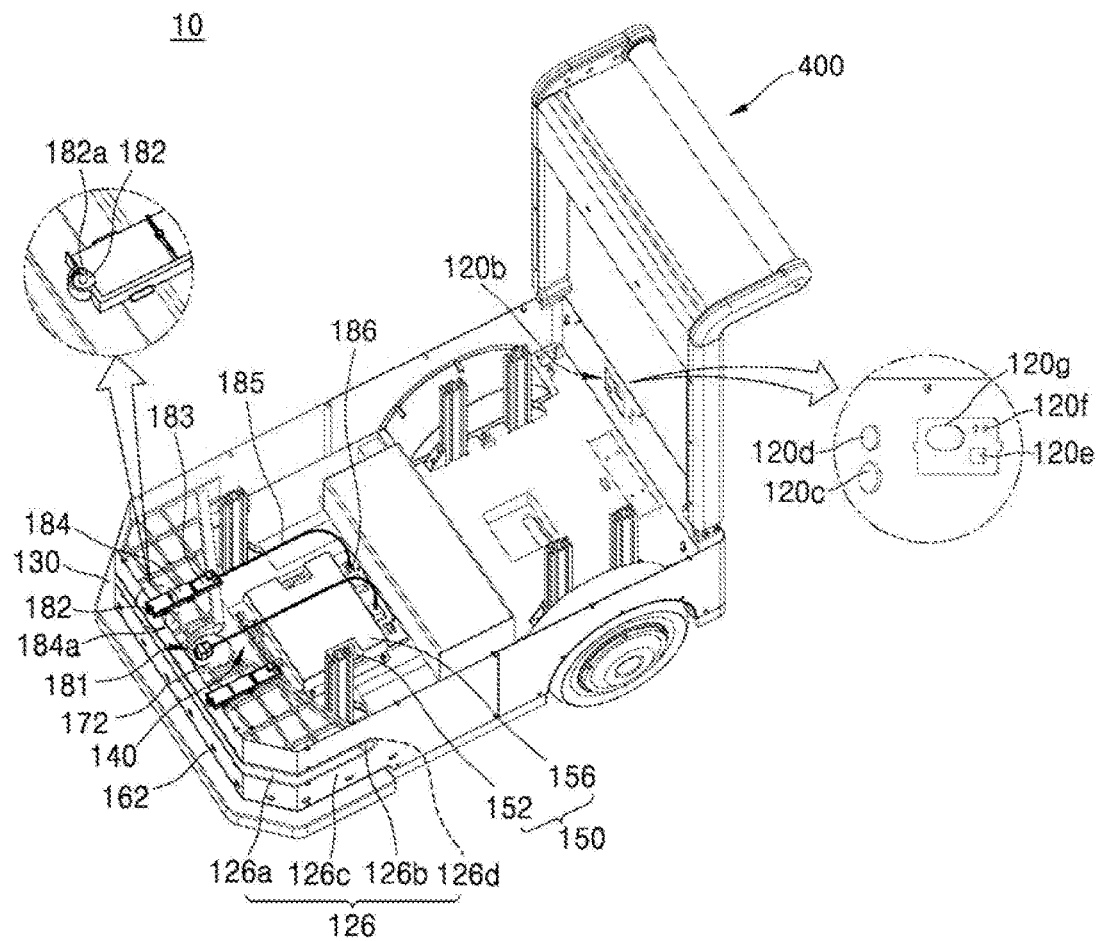
FIG. 3 is a perspective view illustrating a main configuration of the cart robot in FIG. 1.
Figure 4:
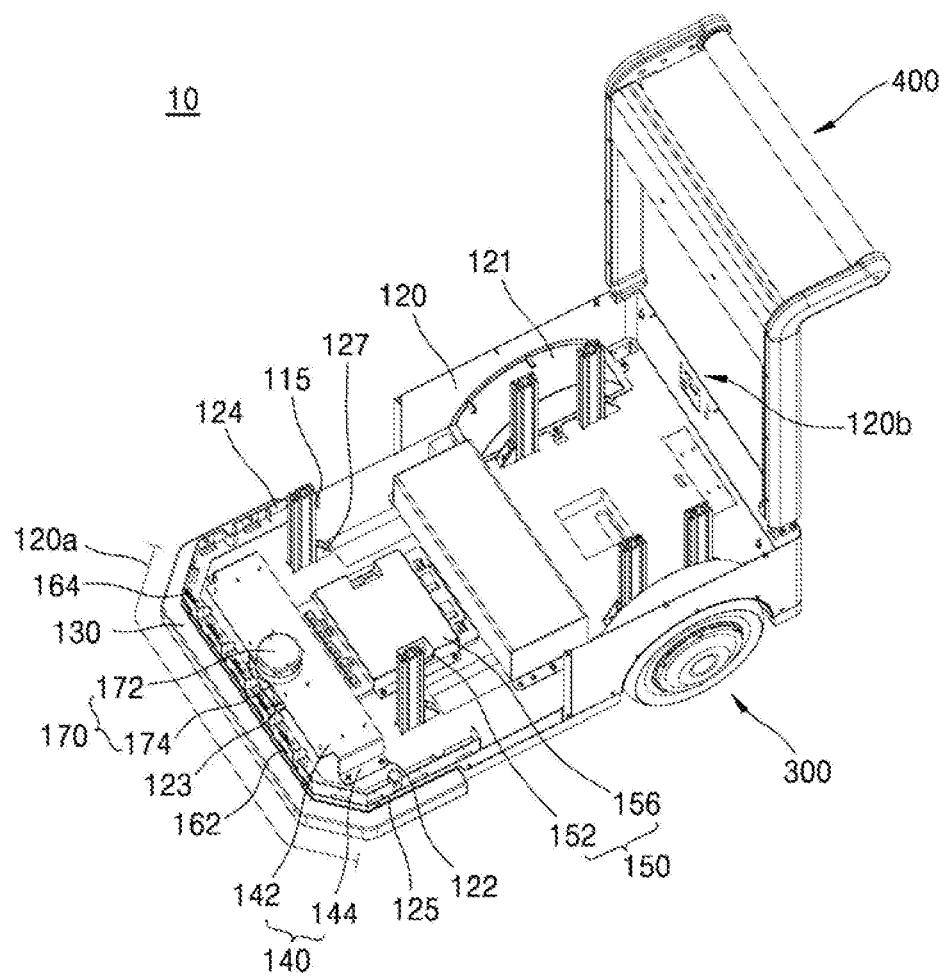
FIG. 4 is a perspective view illustrating an inside of a main body of the cart robot in FIG. 3.
Figure 5:
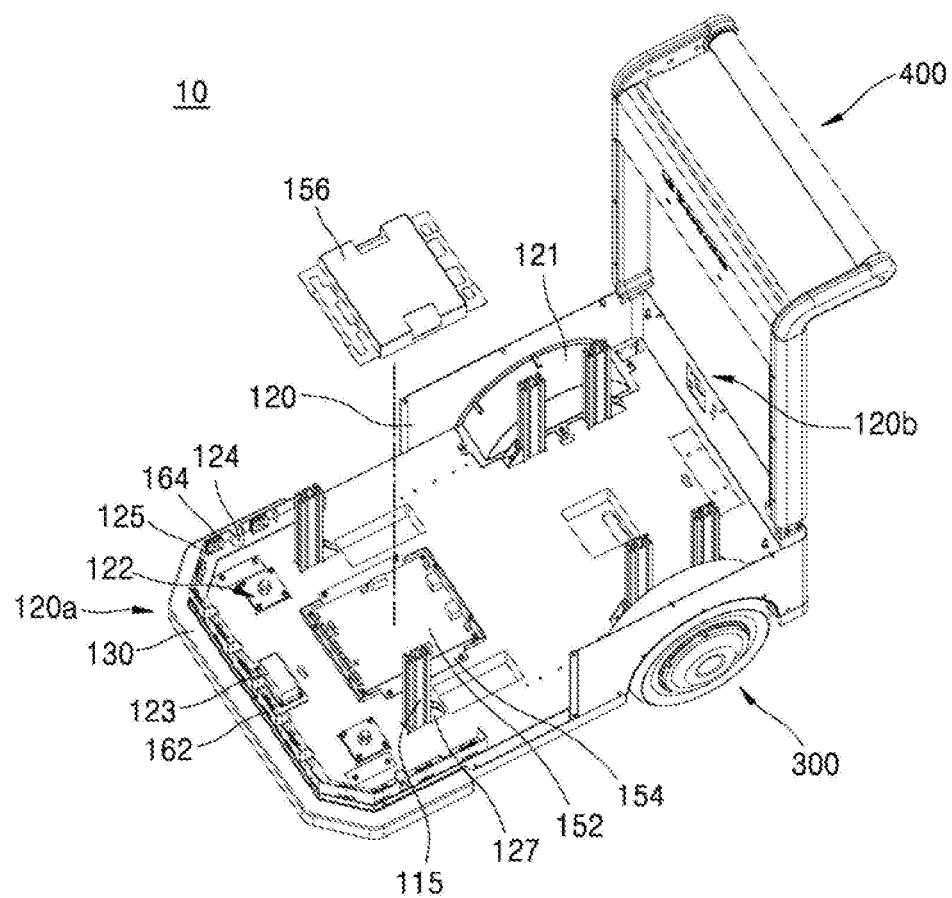
FIG. 5 is a partially exploded perspective view illustrating the inside of the main body of the cart robot in FIG. 4.
Figure 6:
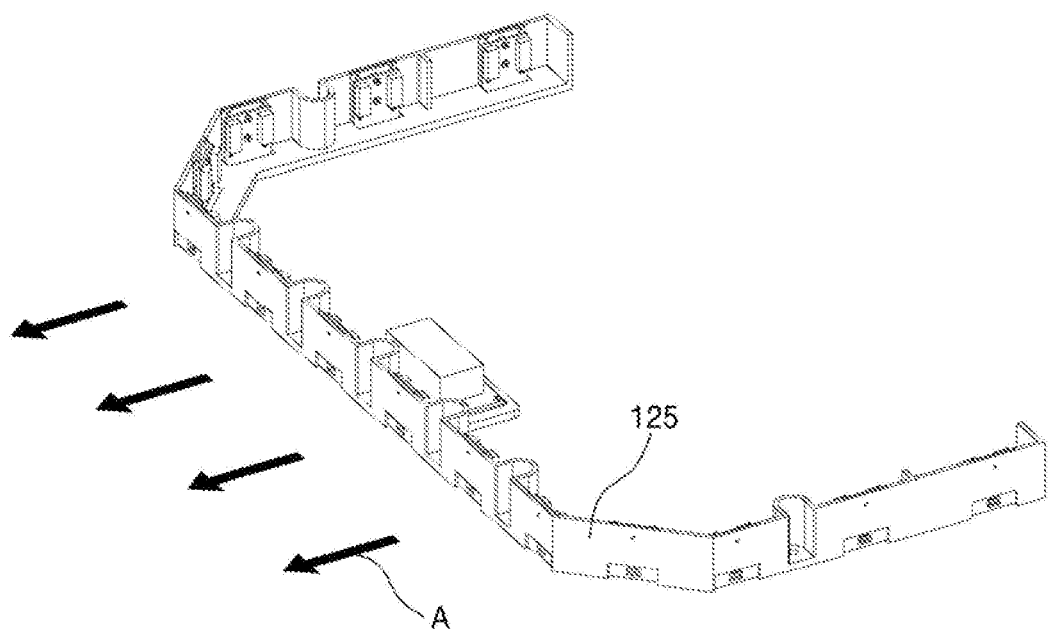
FIG. 6 is a perspective view illustrating a sensor bracket onto which a first sensor module of an exemplary cart robot is mounted.
Figure 7:
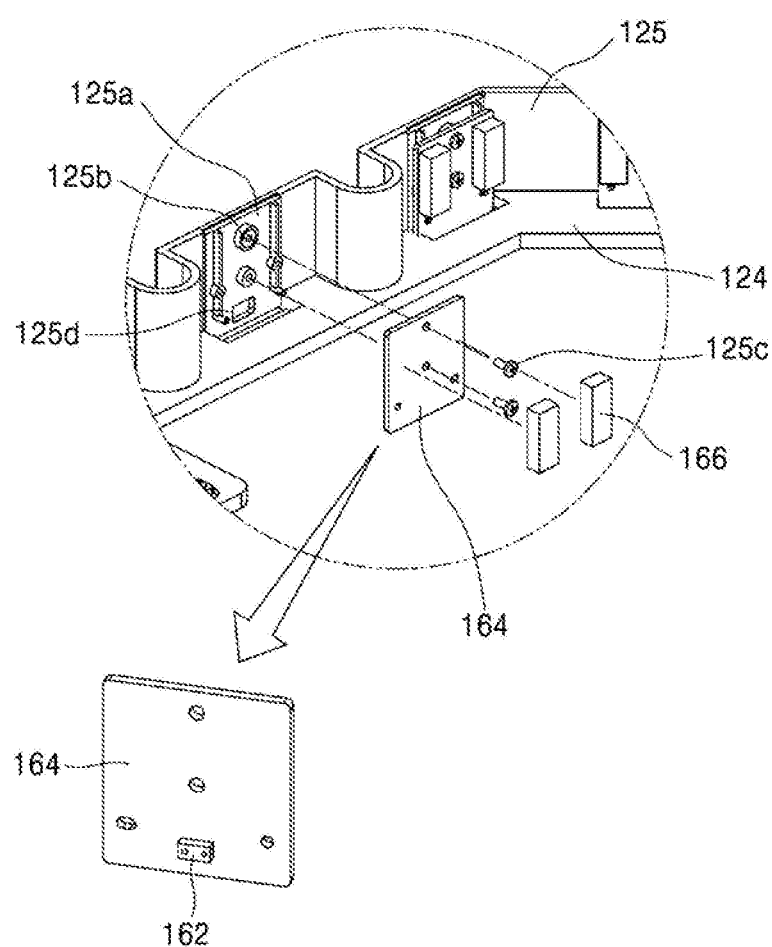
FIG. 7 is an exploded perspective view illustrating a first sensor module of an exemplary cart robot.
Figure 8:
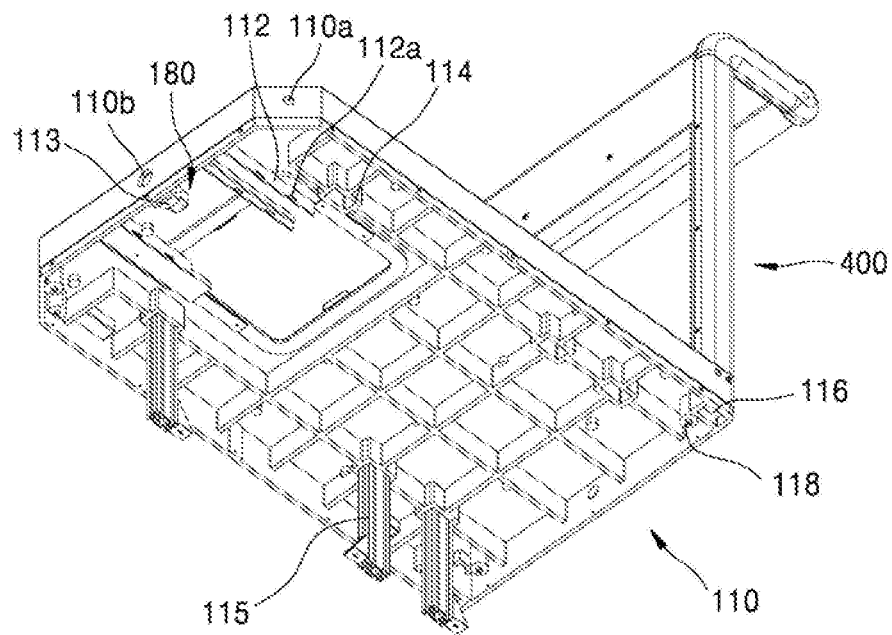
FIG. 8 is a bottom perspective view illustrating an upper portion of a main body of the cart robot in FIG. 1.
Figure 9:
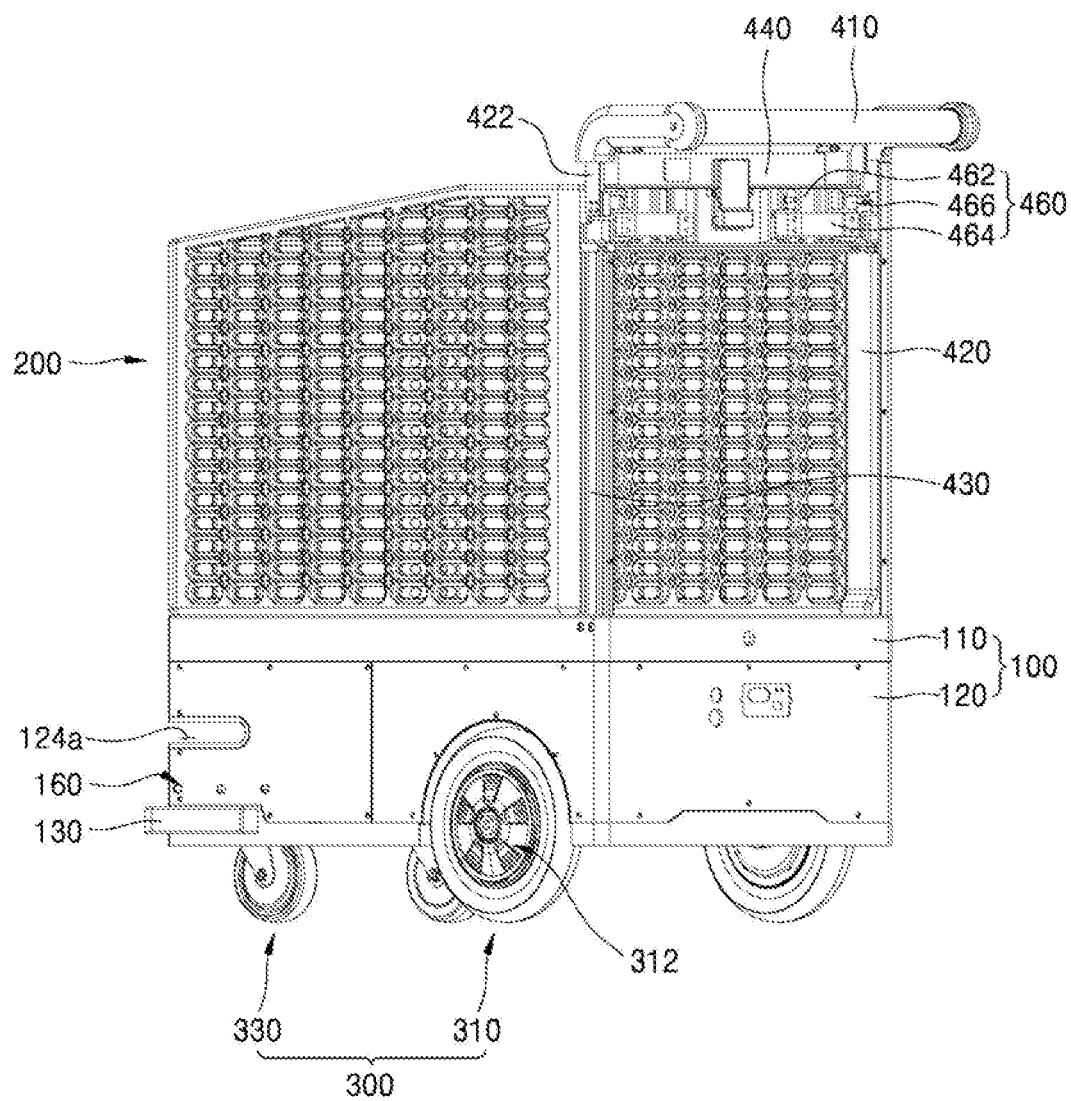
FIG. 9 is a rear perspective view illustrating the cart robot in FIG. 1.
Figure 10:
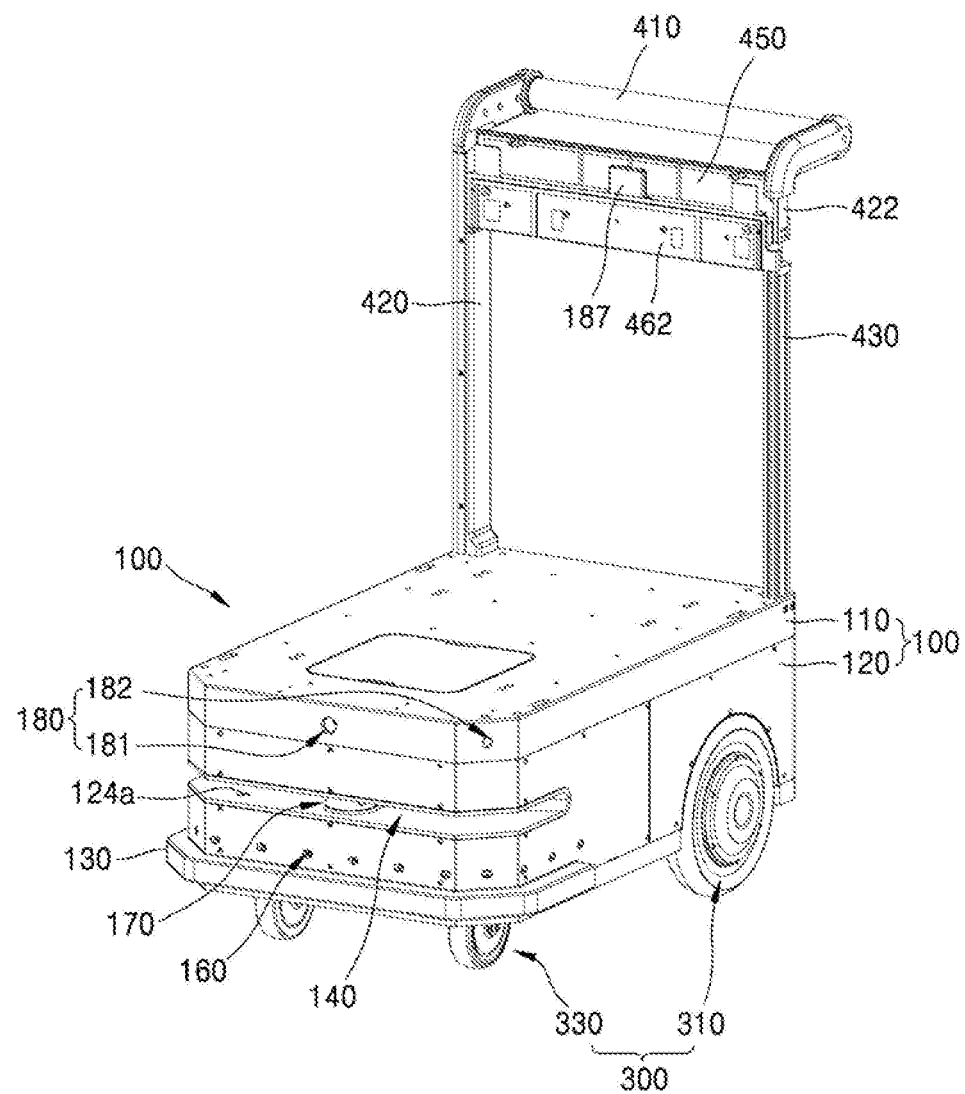
FIG. 10 is a front perspective view illustrating the cart robot in FIG. 1 as a partial configuration.

FIG. 1 is a perspective view illustrating an exemplary cart robot, FIG. 2 is an exploded perspective view illustrating the cart robot in FIG. 1, FIG. 3 is a perspective view illustrating a main configuration of the cart robot in FIG. 1, FIG. 4 is a perspective view illustrating an inside of a main body of the cart robot in FIG. 3, FIG. 5 is an partially exploded perspective view illustrating the inside of the main body of the cart robot in FIG. 4, FIG. 6 is a perspective view illustrating a sensor bracket onto which a first sensor module of an exemplary cart robot is mounted, FIG. 7 is an exploded perspective view illustrating a first sensor module of an exemplary cart robot, FIG. 8 is a bottom perspective view illustrating an upper portion of a main body of the cart robot in FIG. 1, FIG. 9 is a rear perspective view illustrating the cart robot in FIG. 1, and FIG. 10 is a front perspective view illustrating the cart robot in FIG. 1 in a partial configuration (in describing the present disclosure, a direction in which a handle assembly is installed is defined as a rearward direction of the cart robot while a direction opposite to the rearward direction is defined as a forward direction of the cart robot).

As illustrated in FIG. 1, the exemplary cart robot 10 includes a main body 100 equipped with main components, a storage space 200 provided at an upper side of the main body 100, a wheel assembly 300 coupled to a lower portion of the main body 100, and a handle assembly 400 coupled to the rear (e.g., a rear surface) of the main body 100. The storage space may be in the form of a basket.

The main body 100 includes an upper frame 110 and a main housing 120 coupled to each other. Various parts and components are provided in and outside of the main body 100. The main housing 120 is provided with a battery module 140, a main PCB module 150, a first sensor module 160 and a second sensor module 170 therein. The upper frame 110 is provided with a third sensor module 180 thereon. The main housing 120 is provided with a bumper 130 at a front side of the main housing 120 to protect the main body 100 from a collision.

The upper frame 110, as illustrated in FIGS. 1, 2, and 7, forms an accommodation space having a predetermined height, and is provided with the third sensor module 180 in the accommodation space. Accordingly, the upper frame 110 may have a cylindrical shape that is opened downward. Additionally, the upper frame 110 may be made of an insulation material, such as plastics, rubber and the like, not to affect performance of the sensors.

A front of the upper frame 110 has a convex shape and a rear of the upper frame 110 has an approximate "⊏" shape (or "U" shape) that is concave toward the front of the upper frame 110. The shape may prevent legs of a user from bumping into the main body 100 when the user walks while pushing the cart robot 10 after the upper frame 110 is coupled to the main housing 120. Accordingly, the shape may prevent the legs of the user from bumping into the main body 100 when the user handles the cart robot 10. Thus, the user is prevented from being injured and the user's convenience is improved. The front of the upper frame 110 has an approximate '⊏' shape that has edges instead of a convexly curved shape to correspond to a shape and feature of the third sensor module. A front-most side of the upper frame 110 has a straight line shape, and the upper frame 110 has an edge inclined toward both lateral surfaces of the upper frame 110 from the front-most side (e.g., lateral inclined surface). That is, a front-most side/surface of the upper frame 100 may have a central portion that is planar and side portions extending from the central portion that are angled with respect to the central portion.

A camera hole 110b may be formed on the straight line-shaped front surface of the upper frame 110, the camera hole 110b may receive a camera 181, and an antenna hole 110a may be formed on each lateral incline surface of the upper frame 110, each antenna hole 110a receiving a UWB antenna 182a (see FIG. 8). Further, the camera 181 and the UWB antenna 182a are of the third sensor module 180. A first holder 112 and a second holder 113 are formed at positions corresponding to positions of the camera hole 110b and the antenna hole 110a.

A plurality of reinforcement beams 115 for reinforcing strength may be coupled to a surface of the main housing 120, the reinforcement beams 115 do not interfere with the first holder 112 and the second holder 113 (see FIGS. 2 and 3). Further, the plurality of reinforcement beams 115 may be coupled to a respective beam mounting portion 127 surface of the main housing 120. Additionally, a plurality of first supporters 114 into which the reinforcement beams 115 are inserted may be formed on a lower surface of the upper frame 110 (see FIG. 8). The plurality of first supporters 114 may have a same cross-sectional shape as the reinforcement beams 115 to lock the reinforcement beams 115 to the upper frame 110. Additionally, a plurality of second supporters 116 for supporting the below-described handle assembly 400 may be formed on the upper frame 110. A plurality of main coupling bosses 118 for coupling to the main housing 120 may be formed on the lower surface of the upper frame 110.

The first holder 112 is a portion at which a UWB positioning sensor 182 provided with the below-described UWB antenna 182a, a UWB PCB 183, and a UWB sensor including a sensor bracket 184 are provided. A pair of first holders 112 are provided to support a pair of UWB sensors respectively. The first holder 112 has a shape that may support the sensor bracket 184 in a lengthwise direction at both sides. That is, the first holder 112 may include two plates facing each other and formed to protrude from the lower surface of the upper frame 110. The first holder 112 includes a plurality of coupling holes 112a for receiving and connecting to coupling projections 184a formed at the sensor bracket 184.

The second holder 113 is a portion onto which the below-described camera 181 is mounted. A cross section of the second holder 113 may have a frame shape of "E" or "D" and the like to correspond to a shape of the camera 181.

The first supporter 114 has a shape corresponding to the shape of the reinforcement beam 115, and forms an insertion space into which one end of the reinforcement beam 115 is inserted. The first supporter 114 may be coupled to the reinforcement beam 115 through a press fitting or by an additional coupling member. The reinforcement beam 115 may be a structure that has a cuboid shape or a cylindrical shape with a predetermined length. The reinforcement beam 115 is disposed between the upper frame 110 and the main housing 120 and supports loads applied to the upper frame 110. Accordingly, a plurality of reinforcement beams 115 may be distributed and disposed at a portion of the upper frame 110, to which high load is applied. The other end of the reinforcement beam 115 is coupled to the main housing 120 (e.g., coupled to the beam mounting portion 127 of the main housing 120).

The second supporter 116 is a portion into which a handle cover frame 420 and a handle support frame 430 of the handle assembly 400 are inserted and fixed. Accordingly, a pair of second supporters 116 are formed at a position corresponding to a position of the handle assembly 400.

The main coupling boss 118 may have a cylindrical shape, and a plurality of main coupling bosses 118 may protrude downwards along an edge of the lower surface of the upper frame 110. The main coupling boss 118 may be coupled to a groove or a boss that is formed on the main housing 120 to correspond to the main coupling boss 118, or may be coupled to the main housing 120 by an additional coupling member that is inserted into the main coupling boss 118.

The main housing 120, as illustrated in FIGS. 1 to 6, has a predetermined height and forms an accommodation space therein. The main housing 120 has a cylindrical shape that is opened upwards, or may have any other shape. A front side of the main housing 120 is convexly formed in a half circle shape, and a rear side of the main housing 120 is concavely formed toward the front side, or the rear side of the main housing 120 has a rectilinear shape. A convex portion at the front side is defined as a front surface portion 120a, and the concave portion at the rear side is defined as a rear surface portion 120b. The half circle-shaped front surface and the lateral surfaces of the main housing 120 may be connected in a streamlined curved surface shape. The shape is applied to the main housing 120 as a design factor for preventing bumps or interference when the user moves pushing the cart robot 10.

A plurality of holes may be formed on the rear surface portion 120b to accommodate (e.g., receive, be connected to) various types of switches or ports, the various types of switches or ports may be mounted to the rear surface portion 120b and may be exposed outwards from the rear surface portion 120b. For example, a switch hole for a main power switch 120c, a switch hole for an emergency stop switch 120d, a port hole at which a battery charging port 120e is installed, a lamp hole to which an LED 120f displaying a battery charging state is exposed, a port hole at which a port 120g for debugging is installed and the like may be formed in the rear surface portion 120b.

Additionally, a wheel mounting portion 121 for mounting a main wheel 310 of a wheel assembly 300, a caster mounting portion 122 for mounting a sub wheel 330 (e.g., caster wheel) of the wheel assembly 300, and a sensor mounting portion 123 for mounting a second sensor module 170 are formed in the main housing 120. The main wheel 310 with the wheel mounting portion 121 and the sub wheel 330 with the caster mounting portion 122 may be provided in plurality. A step portion 124 having a height shorter than a height of an upper end of the lateral surface of the main housing 120 is formed at the front surface portion 120a of the main housing 120. A sensor bracket 125 for mounting the first sensor module 160 is installed at an upper portion of the step portion 124. Additionally, a beam mounting portion 127, into which a reinforcement beam 115 for reinforcing the upper frame 110 is inserted, may be provided in the main housing 120. The opened upper portion of the main housing 120 is partially blocked by an inner cover 126 to prevent parts and components within the main housing 120 from being exposed outwards.

The wheel mounting portion 121 is a portion onto which a main wheel 310 of the below-described wheel assembly 300 is mounted. The wheel mounting portion 121 is convexly formed from a bottom surface of the main housing 120 in a shape corresponding to a shape of the main wheel 310. The main wheel 310 is rotatably coupled to an outer side of the wheel mounting portion 121. The caster mounting portion 122 is a portion onto which a sub wheel 330 of the wheel assembly 300 is mounted. The caster mounting portion 122 is formed at a position corresponding to a position of the sub wheel 330. The below-described battery module 140 may be mounted onto an upper portion of the caster mounting portion 122.

The sensor mounting portion 123 may be provided on the main housing 120, the sensor mounting portion 123 is a portion to which a below-described second sensor module 170 is coupled, may be provided in a bracket form or a case form. The sensor mounting portion 123 is disposed near the front surface portion 120a of the main housing 120. The sensor mounting portion 123 has a predetermined height (e.g., is positioned at a predetermined height), such that a part of the second sensor module 170 is exposed through a below-described slit 124a.

The step portion 124 having a height shorter than the upper end of the lateral surface of the main housing 120 is formed at parts of the front surface portion 120a and the lateral surfaces of the main housing 120. The bumper 130 is provided at an outer side of the step portion 124, and the sensor bracket 125 is coupled to an upper side of the step portion 124.

The sensor bracket 125 is disposed along an upper end of the step portion 124, and is a long bar-type plate having a predetermined width. The sensor bracket 125 may be formed in a "⊏" shape such that a front surface, in a sensing direction (arrow A direction illustrated in FIG. 6), may be a flat surface. The sensor bracket 125 may also be formed in a half circle in which a front surface in a sensing direction (arrow A direction) is curved. Below, an example in which the front surface of the sensor bracket 125 is flat is described.

The sensor bracket 125 is integrally formed in the main housing 120 or is additionally formed and then coupled to the main housing 120. The sensor bracket 125 is formed to have a height shorter than a height of the upper end of the lateral surface of the main housing 120 in the state being mounted onto the main housing 120. Accordingly, there is a gap between a lower end of the upper frame 110 and an upper end of the sensor bracket 125 in a state in which the upper frame 110 and the main housing 120 are coupled. The gap is defined as a slit 124a.

The bumper 130 is mounted onto an outer side of the sensor bracket 125, and the first sensor module 160 is installed in the sensor bracket 125. To this end, a guide rib 125a that guides an insertion position of the first sensor module 160, a coupling boss 125b and a bolt 125c (or two bolts 125c) for fixing the first sensor module 160, and a plurality of sensor holes 125d to which at least one TOF sensor 162 of the first sensor module 160 is exposed are provided on an inner plate surface of the sensor bracket 125.

The guide rib 125a guides an installation position of the first sensor module 160, and prevents the first sensor module 160 from moving out of the installation position (e.g., being disconnected) in the state in which the first sensor module 160 is inserted. The guide rib 125a, which a "⊏" shaped-rib that is opened downwards, is disposed at an upper side of the first sensor module 160. The guide rib 125a guides an installation position of the first sensor module 160, such that the TOF sensor 162 is exposed exactly at a position of the sensor hole 125d. Accordingly, the first sensor module 160 may be mounted onto an exact position by the guide rib 125a. The coupling boss 125b protrudes from the plate surface of the sensor bracket 184 at a lower side of the guide rib 125a.

The coupling boss 125b is a portion to which the bolt 125c for fixing the first sensor module 160 is coupled, and a plurality of coupling bosses 125b may be provided. A hole is formed at a position corresponding to a position of the coupling boss 125b at the first sensor module 160, and the bolt 125c is fixed into the hole 125b when the bolt 125c is inserted into the coupling boss 125b. At the time of the coupling of the first sensor module 160, the first sensor module 160 contacts an end of the coupling boss 125b, and then the bolt 125c passes through the first sensor module 160 and is coupled to the coupling boss 125b. Thus, the first sensor module 160 is fixed.

The slit 124a is a space that is required so as not to interfere with operations of the below-described second sensor module 170 (that is, the slit 124a allows the second sensor module 170 to not interfere with the first sensor module 160 or the third sensor module 180). The slit 124a may be formed to correspond to a sensing range that may be sensed by the second sensor module 170. The below-described second sensor module 170 is a sensor that may perform sensing in all directions (e.g., 360 degrees, omni-directional). However, the cart robot 10 of the present disclosure is not required to sense an obstacle in the rearward direction of the cart robot 10 because the user stands at the rear of the cart robot 10. Accordingly, the slit 124a may be formed only at partial areas of the cart robot 10 in the forward and lateral directions of the cart robot 10. When necessary, the slit 124a may be extended along the entire lateral surfaces (e.g., side surfaces) of the cart robot 10.

The inner cover 126 may be extended from a forward direction to a rearward direction in the main housing 120, and may have a shape that is bent upwards toward the upper frame 110 from a rearward direction of the second sensor module 170. That is, the inner cover 126 may have a shape that covers approximately one third to half of the inside of the main housing 120. However, the inner cover 126 is disposed at a position lower than a position of the slit 124a and is sufficiently spaced apart from the first sensor module 160 and the second sensor module 170, not to affect sensing. The inner cover 126 may provide a neat appearance to the cart robot 10 and may prevent foreign substances from being introduced into parts and components in the cart robot 10.

The inner cover 126 may include a plate surface portion 126a covering a part of the main housing 120, an upward rib 125b protruding upwards along one side of the plate surface portion 126a, a lateral surface rib 126c extending respectively from both sides of the upward rib 125b in a lengthwise direction of the upward rib 125b, and a coupler 126d formed respectively at ends of the lateral surface rib 126c.

The plate surface portion 126a is a portion for covering the inside of the above-described main housing 120. The upward rib 125b is a portion that extends toward the upper frame 110 and that blocks the inside of the main housing 120, such that the inside of the main housing 120 is not seen (e.g., not visible) from the outside (e.g., outside of the cart robot 10). The lateral surface rib 126c and the coupler 126d are portions that is extended and coupled to a lateral surface portion of the man housing 120. The plate surface portion 126a may have a narrower width from the lateral surface rib 126c toward the coupler 126d. An additional coupling member may be coupled onto the coupler 126d and may couple the inner cover 126 and the main housing 120.

A sensor hole 126a' may be formed at the plate surface portion 126a for receiving and connecting to the second sensor module 170. Additionally, a mounting groove 126b' may be concavely formed at the upward rib 125b not to interfere with the first holder 112 when the upper frame 110 and the main housing 120 are coupled. The first holder 112 may contact the mounting groove 126b' or may be spaced a predetermined distance apart from the mounting groove 126b'.

The bumper 130, which is a portion that absorbs an impact (e.g., collision) of the cart robot 10 with another object, is made of an elastic or rubber material (or any other impact-absorbing material) having a predetermined thickness. The bumper 130 is installed to the front surface portion 120a and wraps around the front surface portion 120a from outside of the front surface portion 120a. The bumper 130 may be extended to a part of the lateral surface of the main housing 120 in addition to the front surface portion 120a.

The bumper 130 protects the main housing 120 and parts and components in the main housing 120 during a collision of the cart robot 10. Accordingly, the bumper 130 is disposed to protrude furthest in the whole cart robot 10 (that is, the bumper 130 extends further outward of the cart robot 10 than any other component of the cart robot 10. Additionally, the bumper 130 at the lateral surface of the main housing 120 may be thinner than the bumper 103 at the front surface portion 120a of the main housing 120, to prevent the cart robot 10 from interfering with surroundings when the cart robot 10 moves. Parts and components and the storage space 200 accommodated in the main housing 120 may all be protected from a direct impact because the bumper 130 protrudes furthest in the whole cart robot 10, thereby enhancing a lifespan and durability of the parts and components of the cart robot 10.

The battery module 140, the main PCB module 150, and the first sensor module 160 to the third sensor module 180 may be provided in the main housing 120 as parts and components. The above-described inner cover 126 exposes the first sensor module 160 and the second sensor module 170 outwards such that the first sensor module 160 and the second sensor module 170 may sense an obstacle, and covers the battery module 140 and the main PCB module 150, such that the battery module 140 and the main PCB module 150 are not seen from outside of the cart robot 10.

The battery module 140, as illustrated in FIG. 4, is disposed on the bottom surface of the main housing 120 adjacent to the front surface portion 120a of the main housing 120. The battery module 140 includes a battery 142 and a battery case 144 coupled onto the bottom surface of the main housing 120. The battery 142 and the battery case 144 are all detachably coupled to the main housing 120.

The battery module 140 is installed at a position corresponding to a position of the caster mounting portion 122. The second sensor module 170 is disposed in a forward direction of the battery module 140. Accordingly, the battery module 140 is disproportionately disposed toward the front side of the main housing 120 as much as possible to the extent that the battery module 140 does not interfere with the second sensor module 170.

When the user is on an upward moving walkway to go upwards, the cart robot 10 may be pushed backwards by weight of the cart robot 10 or by weight of goods stored in the cart robot 10. When the battery module 140 is disproportionately disposed toward the front side of the main housing 120 as in the present disclosure, the center of gravity of the cart robot 10 is located forward of a center of the cart robot 10. Accordingly, even on a moving walkway that is inclined upwards, the cart robot 10 may be prevented from being pushed backwards, thereby improving convenience and safety of the user.

Though not illustrated in the drawing, the battery 142 is electrically connected with a controller (e.g., CPU, processor) of a main PCB 152 and the main wheel 310. Charging and discharge of the battery 142 are controlled by the controller of the main PCB 152, and the battery 142 provides electrical energy to power an electrical motor of the main wheel 310 to provide an assistance force to the cart robot 10. When the main wheel 310 provides an assistance force, an additional force is added in a direction in which the user applies force. Accordingly, the user may easily move the cart robot 10. In the present disclosure, the function of providing an assistance force required for moving a cart robot is defined as a "power-assist function."

The main PCB module 150, as illustrated in FIGS. 3 to 5, includes a main PCB 152 onto which various parts and components for control are mounted, a mounting frame 154 coupled to the main PCB 152 and coupling the main PCB 152 to the main housing 120, and a cover case 156 covering the main PCB 152. A main system OS module may in integrally installed in the main PCB module 150 or may be additionally provided with an OS mounting portion and may be mounted onto the OS mounting portion.

The main PCB 152 is equipped with various parts and components for control (below, defined as a controller for convenience of description). The controller may also be connected to a force sensing module 460 to determine a direction of force applied by the user, and may control the cart robot 10 by providing controlling a motor of the main wheel 310 to generate an assistance force in the direction of the force applied by the user. Therefore, the cart robot 10 may move (e.g., provide an assistance force) in the direction of force applied by the user. Additionally, the controller may determine a location or proximity of the cart robot 10 to one or more obstacles on the basis of results of sensing by the below-described first sensor module 160, the second sensor module 10 and the third sensor module 180, including when an auto-follow function is provided, may control the cart robot 10 to move along with the user (e.g., follow the user) while avoiding collision with the one or more obstacles.

The cover case 156 protects the main PCB 152 and shields the PCB 152 from electromagnetic interference (EMI). The cover case 156, as illustrated in FIG. 4, may cover the main PCB 152 to expose a part of the main PCB 152 or may entirely cover the main PCB 152 such that no portion of the main PCB 152 is exposed.

The first sensor module 160, as illustrated in FIGS. 3 to 6, is a sensor mounted onto the sensor bracket 125, and a plurality of first sensor modules 160 are provided. The first sensor module 160 is used to sense an obstacle in a forward direction and in lateral directions of the cart robot 10. The first sensor module 160 may sense any type of obstacle, such as fixed or moving obstacles and including a lower end of a product stand that is a fixed obstacle among a plurality of obstacles.

Product stands may have a different height or size. However, the lower ends of the product stands are all designed to have a constant height. Accordingly, the first sensor module 160 may be disposed to sense the lower ends of the product stands.

The first sensor module 160 includes a TOF sensor 162 that is an optical sensor, a sensor PCB 164 for controlling the TOF sensor 162, and at least one first sensor connector 166. Each sensor PCB 164 may be connected with the main PCB 152 by the first sensor connector 166 to transmit and receive signals.

The TOF sensor 162 is a sensor of a "time-of-flight (TOF)" type that calculates a distance by measuring the time taken by light to be reflected and to be returned after the light is emitted toward an object from a light source. The TOF sensor 162 is a sensor that, in combination with a camera, may express or sense an object (or multiple objects) three-dimensionally (e.g., in three-dimensions). The TOF sensor 162 may have a high recognition rate including in an environment that is bright because the TOF sensor is readily controlled and is not interrupted by external light during a sensing process.

The TOF sensor 162 is mounted onto the sensor bracket 125 at a predetermined interval in the state of being mounted onto the sensor PCB 164. In the present disclosure, the TOF sensor 162 is used to sense a lower end of a product stand installed in spaces, such as a shopping mall, a mart and the like, and is used to avoid a collision between the cart robot 10 and a product stand (or other obstacle) when the cart robot 10 automatically follows the user.

The sensor PCB 164 connects with the TOF sensor 162 and controls the TOF sensor 162. Additionally, the sensor PCB 164 delivers results of measurement by the TOF sensor 162 to the controller of the main PCB 152. To this end, the sensor PCB 164 electrically connects and communicates with the TOF sensor 162 and the main PCB 152. The sensor PCB 164 may be coupled to the sensor bracket 125 by an additional coupling member, such by fastening, soldering, brazing and the like, or may be coupled to the sensor bracket 125 in a way that the sensor PCB 164 is inserted into a coupling groove and the like. The second sensor module 170 is installed at a position that is not interrupted by the first sensor module 160.

The second sensor module 170, as illustrated in FIGS. 1 to 4, is disposed between the first sensor module 160 and the battery module 140 while being installed near the front surface portion 120a of the main housing 120. Additionally, the second sensor module 170 is disposed at a different height from a height of the first sensor module 160 to avoid interference by the first sensor module 160 (e.g., the first sensor module 160 will sense in a different sensing range than the second sensor module 170). To this end, the above-described sensor mounting portion 123 is provided, and the second sensor module 170 is provided at an upper portion of the sensor mounting portion 123. The second sensor module 170 includes a LiDAR sensor, a sensor case 172 accommodating the LiDAR sensor, and a sensor PCB 174 for controlling the LiDAR sensor.

The LiDAR sensor is accommodated in the sensor case 172. The LiDAR sensor is a sensor that emits laser light to an object subject to sensing and measures time taken by the laser light reflected from the object to return to the LiDAR sensor to measure a distance from the sensor to the object. The LiDAR sensor may have high positioning accuracy and may perform sensing at 360 degrees by using laser light.

In the present disclosure, sensing an object in the rearward direction of the cart robot 10 is not required as described above. Accordingly, the slit 124a for sensing by the LiDAR sensor may not be formed on all of the front, rear, left and right sides of the main housing 120. Instead, the slit 124a may be formed at the front and lateral surfaces of the main housing 120. A sensing range of the LiDAR sensor, for example, may be determined within an angle range of 0 to 160 degrees, including the front and lateral directions. However, the angle range is provided only as an example. When necessary, the slit 124a may be formed entirely at the main housing 120, and the LiDAR sensor may be configured to perform sensing within an angle range of 360 degrees.

The sensor PCB 174 electrically connects with the LiDAR sensor, controls the LiDAR sensor and transmits sensing results of the LiDAR sensor to the controller of the main PCB 152. Thus, the sensor PCB 174 may electrically connect and communicate with the LiDAR sensor and the main PCB 152.

The third sensor module 180, as illustrated in FIGS. 1 to 3, and FIG. 10, is accommodated on the above-described upper frame 110 and may not exposed outwards. The third sensor module 180 may include a UWB positioning sensor 182 provided with an ultra-wideband (UWB) antenna, a UWB sensor including a UWB PCB 183, a camera 181, a UWB main PCB 187 (FIG. 10), a signal line 185, a connector 186 and the like. The UWB PCB 183 and the camera 181 are connected to the main PCB 152 by the signal line 185 and the connector 186 to transmit and receive signals.

The UWB positioning sensor 182 tracks a location of a transmission module of the user (e.g., the user is in possession of the transmission module) to allow the cart robot 10 to perform the auto-follow function (e.g., automatically follow the user), and the sensing results by the UWB positioning sensor 182 may be delivered to the controller by the UWB PCB 183. Additionally, the UWB main PCB 187 may process signals received from the transmission module held by the user and may deliver the processed signals to the controller. The UWB main PCB 187 may be installed on the below-described handle assembly 400 instead of the main housing 120 to smoothly communicate (e.g., have a good connection, so as to communicate without interference or with minimum interference) with the transmission module (description in relation to this is provided hereunder). When an auto-follow function is used by the cart robot 10, the controller may track a location of the user on the basis of results of sensing by the UWB positioning sensor 182 and may control the cart robot 10 to automatically follow (e.g., move in the direction of the user). In the present disclosure, the function in which the cart robot 10 automatically moves following a user according to movements of the user provided with a transmission module is defined as an "auto-follow function" or a "user-follow function".

The above-described first sensor module 160, second sensor module 170 and third sensor module 180 may be disposed in the main housing 120 to perform the best possible function without affecting each other's sensing.

The UWB antenna 182a is placed at a front-most portion of the main housing 120 to minimize sensitivity and noise of the antenna, but is placed further rearwards than the bumper 130 to protect the sensors. The camera 181 of the third sensor module 180 may be spaced apart from the UWB positioning sensor 182 in a rearward direction. The first sensor module 160 provided with the TOF sensor 162 that is an optical sensor may be disposed further rearwards than the camera 181 and may be disposed further forwards than the LiDAR sensor. As long as the LiDAR sensor is installed at a height different from the height of the other sensors (e.g., the sensors of the first sensor module 160 or the sensors of the third sensor module 180), so that the sensing function of the LiDAR sensor is not affected. Accordingly, the LiDAR sensor may be installed at a position corresponding to a position of the slit 124a.

The cart robot 10 of the present disclosure having the above-described configuration is provided respectively with the storage space 200 at an upper portion of the main body 100, the wheel assembly 300 at a lower portion of the main body 100 and the handle assembly 400 at the rear of the main body 100.

The storage space 200, as illustrated in FIGS. 1 and 2, is coupled to the upper portion of the main body 100 and forms an accommodation space that stores goods. The storage space 200 may be made of an insulation material such as rubber or plastic and the like not to affect performance of surrounding sensors. The storage space 200 may be fixed to the upper portion of the main body 100 or may be detachably coupled to the upper portion of the main body 100.

The wheel assembly 300, as illustrated in FIGS. 1 to 3, is provide at the lower portion of the main housing 120 and movably supports the cart robot 10. The wheel assembly 300 may include a pair of main wheels 310 and a pair of sub wheels 330.

The main wheel 310 is rotatably coupled respectively to both rear sides of the lower end of the main body 100. The main wheel 310 movably supports the cart robot 10 and is provided with an in-wheel motor 312 therein. When the user pushes the cart robot 10, the main wheel 310 may rotate manually, or may rotate semi-automatically or automatically by receiving a rotational driving force from the in-wheel motor 312, and the in-wheel motor may receive electric power from the battery 142. The main wheel 310 is a moving means that movably supports the cart robot 10. Accordingly, the main wheel 310 may be several times larger than the sub wheel 330.

The in-wheel motor 312, which is a motor directly connected to the inside of the main wheel 310, receives electric power from the battery 142 and generates a rotational driving force that rotates the main wheel 310. The main wheel 310 may be controlled to operate only when a power-assist function is performed, and the sub wheel 330 assists the main wheel 310 by adding an assistance force to the main wheel 310 such that the user easily moves the cart robot 10. The in-wheel motor 312 communicates with the controller of the main PCB 152 and is controlled by the controller.

The sub wheel 330 is smaller than the main wheel 310, and is rotatably coupled near the front of the lower side of the main housing 120. The sub wheel 330 balances the main body 100 such that the main body 100 does not tilt forwards when the cart robot 10 moves. Further, the sub wheel 330 may be a caster wheel that can rotate in any direction (e.g., an omnidirectional wheel), to allow the cart robot 10 to be easily maneuvered by a user handling the handlebar 410.

The handle assembly 400, as illustrated in FIGS. 9 and 10, is provided at the rear sides of the main body 100 and the storage space 200. The handle assembly 400 may be coupled to the storage space 200 and may also be coupled to the main body 100. The handle assembly 400 includes a handlebar 410 that is a portion held by the user, a handle cover frame 420 that supports the handlebar 410, and a handle support frame 430 that is inserted into the handle cover frame 420 and that supports the handlebar 410. A pair of handle cover frames 420 and a pair of handle support frames 430 are provided. A front surface cover 450 and a rear surface cover 440 are coupled between the pair of handle cover frames 420 in order for main parts and components to be installed. The force sensing module 460, and the UWB main PCB 187 for the third sensor module are installed in an inner space formed by the coupled covers. For the force sensing module 460 and the UWB main PCB 187 for the third sensor module, a signal line may be extended to the inside of the handle cover frame 420 and may be connected to the main PCB 152.

The handlebar 410, which may be a straight line-shaped (e.g., linearly-shaped) bar, and may have a cylindrical shape having a circular cross section or may have a rectangular cross section or a cross section with any other shape. The handlebar 410 is a portion that is a handle held by the user. When the user holds the handlebar 410 and pushes the handlebar 410 forwards, the cart robot 10 moves forwards, and when the user holds the handlebar 410 and pulls the handlebar 410 rearwards, the cart robot 10 moves rearwards. Alternately, when the user holds the handlebar 410 and pushes the handlebar 410 to the left or to the right, a direction of the cart robot 10 is changed in the direction in which the handlebar 410 is pushed while the sub wheel 330 rotates. The force of pushing or pulling the handlebar 410 is sensed by the force sensing module 460, may be delivered to the controller and then may be used to provide a power-assist function. The handle cover frame 420 is coupled respectively to both ends of the handlebar 410. The handlebar 410 and the handle cover frame 420 may be made of an insulation material, such as plastic and rubber and the like not to affect performance of surrounding sensors.

The handle cover frame 420 is a reversed "¬" shaped frame in which an upper portion is bent toward the rearward direction. A pair of handle cover frames 420 are provided and support both ends of the handlebar 410 respectively. The handle support frame 430 having a shape corresponding to the shape of the handle cover frame 420 is inserted into the handle cover frame 420. In some cases, the handle cover frame may also have a structure in which a connection bracket 422 is inserted into an upper portion of the handle cover frame 420, and in which the handle support frame 430 is connected to a lower portion of the connection bracket 422. Lower ends of the handle cover frame 420 and the handle support frame 430 are coupled to the upper frame 110 through an additional coupling member, such as a bolt and the like, and may be coupled to a lower portion in the upper frame 110. Accordingly, the coupled portion is not exposed outwards. The front surface cover 450 and the rear surface cover 440 are coupled to each other and form an accommodation space between the handle cover frames 420.

The front surface cover 450 and the rear surface cover 440, which are plates, may have the same shape, and are disposed in a way that crosses the pair of handle cover frames 420. The front surface cover 450 and the rear surface cover 440 protect inner parts and components such that the inner parts and components are not exposed outwards. As illustrated in FIG. 7, the force sensing module 460 and the UWB main PCB 187 for the third sensor module are coupled in the space formed by the coupled front surface cover 450 and the rear surface cover 440.

The force sensing module 460 includes a support frame 462 coupled to the front surface cover 450 and the rear surface cover 440, a load cell 464 installed on the support frame 462, and a connection frame 466 connecting the load cell 464 with the handlebar 410.

The support frame 462 has a plate shape having a predetermined surface area and supports a pair of load cells 464. One end of the load cell 464 is coupled respectively to both sides of the plate surface of the support frame 462. The other end of the load cell 464 is coupled to the above-described connection bracket 422 by the connection frame 466. A force (or multiple forces) applied to the handlebar 410 by the user is transferred to the connection frame 466 of the force sensing module 460 and to the load cell 464 through the connection bracket 422.

A pair of load cells 464 are provided and are respectively coupled to both sides of the support frame 462. The load cell 464 is a force sensor for determining a direction of the force applied to the handlebar 410. The load cells 464 may have a bar shape, and, as described above, one end of the load cell 464 is coupled to the connection frame 466 and the other end of the load cell 464 is coupled onto the support frame 462.

One end of the load cell 464, coupled to the connection frame 466, is a free end, and the other end of the load cell 464, coupled to the support frame 462, is a fixed end. Accordingly, the free end of the load cell 464 is deformed when force is applied to the connection frame 466. Due to the deformation of the free end, resistance values of the load cell 464 are changed, and, on the basis of the changed resistance values, a direction of external force may be determined.

In the present disclosure, when describing an end of the force sensor as a free end, it an end that is not coupled or fixed to anything When the user pushes or pulls the handlebar 410, the handlebar 410 serves as a force point to which force is applied, and the load cell 464 serves as an action point which receives the applied force and acts, on the basis of the lever theory. The connection frame 466 serves as a supporting point for delivering force. The user applies a force to the handlebar 410, which is transferred to the load cell 464 by the connection frame 466 to deforms the load cell 464, and, accordingly, a direction of the force applied to the handlebar 410 may be sensed. A sensing value of the load cell 464 may be delivered to the controller, and the controller senses the direction of the force applied to the handlebar 410 on the basis of the sensing value. Sensing a direction of force applied to the handlebar 410 is defined as "force sensing".

When the user moves the cart robot 10 forwards by pushing the handlebar 410, the controller may sense a direction of force and may determine a "power assist" is required in a direction in which the cart robot 10 moves forwards. The controller controls the in-wheel motor 312 to generate a rotational force in the main wheel 310. The main wheel 310 receives the assistance force from the controller and moves forwards.

Suppose that force applied by the user to push the cart robot 10 is 10. Then force of pushing the cart robot 10, which is 90, may be additionally provided through the power-assist function. In this case, the cart robot 10 is moved as if the cart robot 10 is pushed with a force of 100, but the user actually applies force of 10. Accordingly, the user may move the cart robot 10 using a small amount of force, and convenience of the user is improved.

When the user pulls the handlebar 410 and moves the cart robot 10 rearwards, the controller may determine "power assist" is required in a direction in which the cart robot 10 moves rearwards. The controller may control the in-wheel motor 312 to generate a rotational driving force to the main wheel 310. The main wheel 310 receives the rotational driving force from the controller and moves forwards. The user may easily move the cart robot 10 using the power-assist function. The UWB main PCB 187 that is a component of the third sensor module 180 may be installed in the rearward direction of the force sensing module 460.

The UWB main PCB 187, which is to provide an auto-follow function, may be installed on a sensor installation portion 112 of the upper frame 110 or on a rear surface of the support frame 462. The UWB main PCB 187 may be electrically connected to the controller of the main PCB 152 and may communicate with the controller of the main PCB 152. The UWB main PCB 187 is installed at a position in to avoid signal interference and the like. When a metallic material approaches to the UWB main PCB 187, signal interference and noise generation are increased. Accordingly, the storage space 200 and the force sensing module 460 are preferably spaced a predetermined distance apart from the UWB main PCB 187.

When the storage space 200 is made of an insulation material, such as plastic, rubber and the like, a distance between the storage space 200 and the UWB main PCB 187 may not be considered. However, when the storage space 200 is made of a metallic material to ensure enough strength, the storage space 200 has to be spaced apart from the UWB main PCB 187 at a minimum interval. For example, a minimum interval between the UWB main PCB 187 and the storage space 200 may be set to 10 cm.

As described above, the exemplary cart robot may sense and track a location of a transmission module and may provide an "auto-follow function" in which the cart robot automatically moves following a user when the user possesses the transmission module. In this case, the cart robot may distinguish and recognize an obstacle such as a product stand in a mart from a person. Accordingly, when tracking the location of the transmission module, the cart robot may move while automatically avoiding an obstacle and a person, thereby improving convenience of the user.

Additionally, the exemplary cart robot may provide a "power-assist function" of assisting with force applied by a user to the cart robot when the user manually handles the cart robot. Accordingly, the user may readily handle or control the cart robot, thereby improving convenience of the user.

Further, the battery of the exemplary cart robot is disposed at the front side of the main body. Accordingly, the center of gravity is placed forwards. Even when the cart robot moves on an inclined moving walkway, the cart robot is not pushed rearwards, thereby causing no inconvenience to the user.

The present disclosure has been described with reference to the embodiments illustrated in the drawings. However, the disclosure is not limited to the embodiments and the drawings set forth herein. Further, various modifications may be made by one having ordinary skill in the art within the scope of the technical spirit of the disclosure. Further, though not explicitly described during description of the embodiments of the disclosure, effects and predictable effects according to the configuration of the disclosure should be included in the scope of the disclosure.

What is claimed is:

1. A cart robot, comprising:
   a storage space to store goods;
   a main body coupled to a bottom of the storage space to support the storage space;
   a handle assembly connected to a rear side of the main body;
   a wheel assembly rotatably coupled to a bottom of the main body and configured to move the main body in a direction of a force applied to the handle assembly by a user; and
   a plurality of sensor assemblies provided at a front side of the main body, the front side of the main body being opposite to the rear side of the main body,
   wherein sensing ranges of the plurality of sensor assemblies do not interfere with each other,
   wherein the plurality of sensor assemblies includes:
      a first sensor assembly provided at the front side of the main body and configured to sense an object in front of the cart robot;
      a second sensor assembly provided at the front side of the main body and spaced from the first sensor assembly, the second sensor assembly being configured to sense an object different from the object sensed by the first sensor assembly; and
      a third sensor assembly provided at the front side of the main body spaced from the first sensor assembly and the second sensor assembly, the third sensor assembly being configured to sense and track a location of a transmission module of a user to allow the cart robot to follow the user, the third sensor assembly including:
         a camera; and
         an ultra-wideband (UWB) sensor including a UWB positioning sensor having a UWB antenna, a UWB PCB controlling the UWB positioning sensor, and a UWB main PCB communicating with the transmission module of the user.

2. The cart robot of claim 1, wherein the main body includes:
   a main housing having an open top and an accommodation space defined therein;
   an upper frame coupled to the open top of the main housing to cover the accommodation space; and
   a slit at the front side of the main body between the main housing and the upper frame.

3. The cart robot of claim 2, wherein the first sensor assembly includes:
   a plurality of Time of Flight (TOF) sensors respectively facing a forward direction and lateral directions; and
   a sensor printed circuit board (PCB) configured to control the plurality of TOF sensors.

4. The cart robot of claim 3, wherein the second sensor assembly includes:
   a LiDAR sensor; and
   a sensor printed circuit board (PCB) configured to control the LiDAR sensor, and wherein the second sensor assembly is provided at a height different from a height of the first sensor assembly.

5. The cart robot of claim 4, further comprising:
a battery; and
a main PCB including a controller, the controller being configured to:
control charging and discharging of the battery, and
control the wheel assembly to move the cart robot to follow the user based on the location of the transmission module of the user sensed and tracked by the third sensor assembly.

6. The cart robot of claim 4, wherein the handle assembly includes:
a handlebar that receives the force applied by the user;
a pair of handle cover frames, each handle cover frame being coupled to a respective end of the handlebar to support the handlebar; and
a force sensing assembly including:
a pair of load cells sensing a magnitude and a direction of the force applied to the handlebar, each load cell being provided at a respective side of a lower portion of the handlebar;
a pair of connection frames connecting the load cells with the handlebar; and
a support frame disposed between the handle cover frames and coupled to the load cells,
wherein a first end of each load cell, coupled to the support frame, is a fixed end, and a second end of each load cell, coupled to the connection frame, is a free end.

7. The cart robot of claim 6, wherein the UWB main PCB is provided at a first side of the handle assembly and is spaced apart from the force sensing assembly.

8. The cart robot of claim 7, wherein the force sensing assembly is provided at a second side of the handle assembly opposite of the first side of the handle assembly.

9. The cart robot of claim 1, further comprising a bumper coupled to the front portion and the lateral portions of the front side of the main body and protruding further from the main body than the first sensor assembly, the second sensor assembly, and the third sensor assembly.

10. A cart robot, comprising:
a storage space to store goods;
a main body coupled to a bottom of the storage space to support the storage space, the main body including:
a bottom;
a rear side; and
a front side opposite to the rear side, the front side having:
a front portion; and
lateral portions, each lateral portion extending from a respective side of the front portion and being oblique with respect to the front portion;
a handle assembly connected to the rear side of the main body;
a wheel assembly rotatably coupled to the bottom of the main body, the wheel assembly including:
a main wheel; and
an in-wheel motor provided inside of the main wheel and configured to apply a rotational force to the main wheel to move the cart robot; and
a plurality of sensor assemblies respectively provided at the front portion and the lateral portions of the front side of the main body for respectively sensing obstacles in front of the cart robot and for tracking a transmission module of a user, wherein sensing ranges of the plurality of sensor assemblies do not interfere with each other,
wherein the plurality of sensor assemblies, includes:
a first sensor assembly provided at the front side of the main body and configured to sense an object in front of the cart robot;
a second sensor assembly provided at the front side of the main body and spaced vertically from the first sensor assembly, the second sensor assembly being configured to sense an object different from the object sensed by the first sensor assembly; and
a third sensor assembly provided at the front side of the main body spaced from the first sensor assembly and the second sensor assembly, the third sensor assembly being configured to sense and track a location of the transmission module of the user to allow the cart robot to follow the user, the third sensor assembly including:
a camera; and
an ultra-wideband (UWB) sensor including a UWB positioning sensor having a UWB antenna, a UWB PCB controlling the UWB positioning sensor, and a UWB main PCB communicating with the transmission module of the user.

11. The cart robot of claim 10, further comprising:
a battery; and
a main PCB including a controller, the controller being configured to:
control charging and discharging of the battery, and
control the in-wheel motor of the wheel assembly to move the cart robot to follow the user based on the location of the transmission module of the user sensed and tracked by the third sensor assembly.

12. The cart robot of claim 10, wherein the main body further includes:
a main housing having an open top and an accommodation space defined therein;
an upper frame coupled to the open top of the main housing to cover the accommodation space; and
a slit at the front side of the main body between the main housing and the upper frame, and
wherein the second sensor assembly is provided in the slit.

13. The cart robot of claim 10, wherein the first sensor assembly includes:
a plurality of Time of Flight (TOF) sensors respectively provided on the front portion and the lateral portions of the front side of the main body; and
a sensor printed circuit board (PCB) configured to control the plurality of TOF sensors.

14. The cart robot of claim 13, wherein the handle assembly includes:
a handlebar that receives the force applied by a user;
a pair of handle cover frames, each handle cover frame being coupled to a respective end of the handlebar to support the handlebar; and
a force sensing assembly including:
a pair of load cells sensing a magnitude and a direction of the force applied to the handlebar, each load cell being provided at a respective side of a lower portion of the handlebar;
a pair of connection frames connecting the load cells with the handlebar; and
a support frame disposed between the handle cover frames and coupled to the load cells, wherein a first end of each load cell, coupled to the support frame, is a fixed end, and a second end of each load cell, coupled to the connection frame, is a free end.

15. The cart robot of claim 14, wherein the UWB main PCB is provided at a first side of the handle assembly and is spaced apart from the force sensing assembly, and wherein the force sensing assembly is provided at a second side of the handle assembly opposite of the first side of the handle assembly.

16. The cart robot of claim 10, further comprising a bumper coupled to the front portion and the lateral portions of the front side of the main body and protruding further from the main body than the first sensor assembly, the second sensor assembly, and the third sensor assembly.

* * * * *